CLARK & YOST.

Plow.

No. 14,224.

Patented Feb 12, 1856.

UNITED STATES PATENT OFFICE.

JOHN CLARK, OF WASHINGTON, DISTRICT OF COLUMBIA, AND G. W. N. YOST, OF PITTSBURG, PENNSYLVANIA.

IMPROVEMENT IN PLOWS.

Specification forming part of Letters Patent No. 14,224, dated February 12, 1856.

*To all whom it may concern:*

Be it known that we, JOHN CLARK, of Washington, District of Columbia, and G. W. N. YOST, of Pittsburg, Pennsylvania, have invented certain Improvements in Plows, of which the following is a specification.

Our invention consists in the arrangement of the cutting-edge of the share and colter of the common plow now in use, whereby we are enabled to obtain a free cutting, and to a great extent an anti-friction plow.

We are aware that many devices have been brought forward to counteract the constant wear of the cutting-edges of the plow, and none of them, so far as we can learn, have been brought into general use, because of the impracticability and complexity by which they are gotten up. The liability of clogging and the great amount of friction produced by their arrangement suffices of itself to prevent their general use, and the most important question is not looked to. The expense of getting up such plows places them beyond the reach of many farmers who are not able to purchase them. But by our arrangement we can construct a very cheap plow, and can attach it to any plow with a very trifling expense, and we do away, to a great extent, with the friction caused by the earth and other objects which the cutting-edge comes in contact with, and thereby lightening the draft on the team. Further, we have a very neat, cheap, and simply-constructed plow, which by the following description will be clearly seen.

Figure 1:
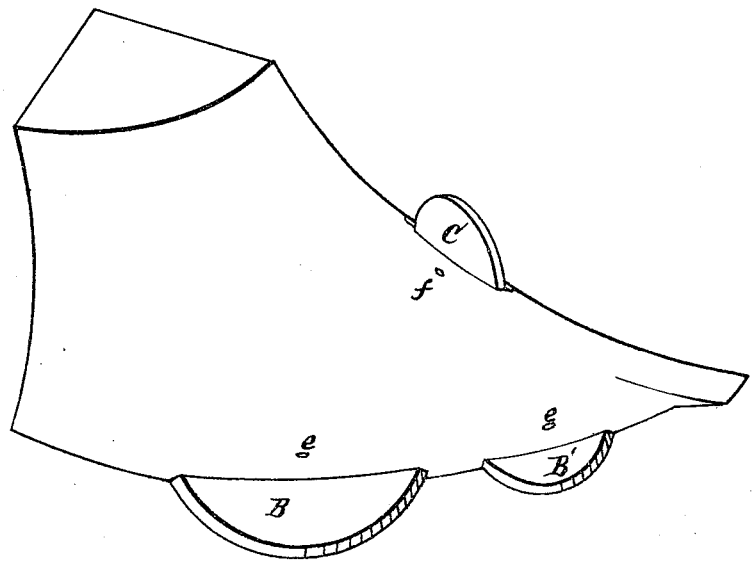
Figure 2:
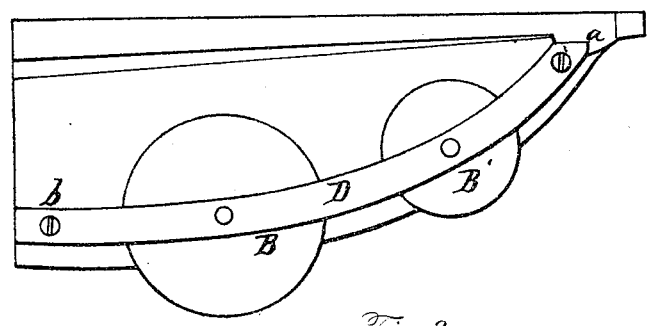
Figure 3:
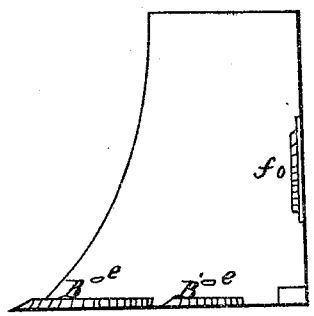

Figure 1 represents a perspective of the plow-body, showing the arrangement of the revolving cutters B B' and C. Fig. 2 exhibits the under side or sole of the plow, and Fig. 3 a front elevation of the same.

To the sole of the plow we bolt firmly a curved bearing-plate D, extending from the point or nose along the under side of the ring of the mold-board, and bolted to the heel *b*. This plate serves for the under bearings of a series of revolving cutters or shares, B B', and also to prevent said cutters from dragging on the ground, thereby wearing them out in a short time. The upper ends of the shafts of these cutters have their bearings in the mold-board at the points *e e*. (Shown in Fig. 1.) The wing or edge of the mold-board extends over and above the cutters B B', and is made to fit nicely to them, so as to act as a scraper to clean the cutters in their revolutions by removing the adhesive mold. The plate D described above serves a similar purpose.

The revolving cutter B is made larger and placed a little farther out than the one before it, and is so arranged is to present a curved outline parallel to the edge of the mold-board and of the same shape as the common share. At the point *f*, in a line with the colter, we place another revolving cutter, C, similar to the revolving shares, but seperating at right angles with them and revolving around an axle secured to the mold-board and landside. This cutter skims just below the surface of the ground, thereby cutting and distributing the sward as the plow advances.

It will be clearly seen that by the forward motion of the plow the pressure of the mold or sward on the surface of the circular cutting-shares will cause them to revolve and cut away the earth before them speedily, and they being turned around stationary shafts set in the body of the plow will revolve with ease and facility. Nearly half of the cutters B B' project beyond the edge of the mold-board and let the sward slide over them, as they revolve with great ease, which facilitates the draft of the plow and lessens the friction on the share, which necessarily must save the wear to a great extent.

Our form of plow is wonderfully adapted to wet, soddy, and tenacious soil, and being so simple in construction and applicable with a very trifling alteration to any common plow now in use that an ordinary blacksmith could construct one, while at the same time it presents a very efficient and practicable plow. We have described only two revolving cutters for the shares and one for the colter, but we wish it to be understood that we may use any number which we may deem necessary.

Having thus fully described our invention, and set forth its advantages over the cutting arrangements now in use, we claim—

The revolving share-cutters B B', attached to the mold-board, in combination with the bearing plate or strap D and the extension of the landside (or the equivalents of said bearing-plate D and extension of said landside) for the purpose of securing the free and certain revolution of the series of revolving share-cutters B B', substantially in the manner and for the purposes herein set forth.

JOHN CLARK.
GEO. W. N. YOST.

Witnesses:
T. CAMPBELL,
JOHN S. HOLLINGSHEAD.